United States Patent Office 3,385,874
Patented May 28, 1968

3,385,874
γ-FORMYL-N,N'-DIHYDROCARBYL-AMINOTRO-
PONEIMINES AND DERIVATIVES THEREOF
Alden Dwayne Josey, Wilmington, Del., assignor to E. I.
du Pont de Nemours and Company, Wilmington, Del.,
a corporation of Delaware
No Drawing. Filed June 4, 1964, Ser. No. 372,713
14 Claims. (Cl. 260—429)

ABSTRACT OF THE DISCLOSURE

γ-Substituted-N,N'-bis(hydrocarbyl substituted)-aminotroponeimines, prepared by reacting a N-γ-dilithio-N,N'-disubstituted-aminotroponeimine with a carbonyl compound, and derivatives thereof including chelates are claimed. These compounds are useful as dyes.

This invention relates to cycloheptatrienes having adjacent monosubstituted amino and substituted imino groups on the carbocyclic nucleus and as an additional nuclear substituent, a carbonyl group (or derivative).

These new compounds can also be described as aminotroponeimines which have a further substituent on each of the nitrogens and a carbonyl group or derivative thereof on the γ-nuclear carbon (or the 4-carbon when named as a cycloheptatriene). The amino and imino substituents are each hydrocarbyl of up to 18 carbons, and are preferably saturated aliphatic hydrocarbon or aromatic hydrocarbon.

A particularly preferred new class of compounds of this invention are the γ-formyl-N,N'-disubstituted-aminotroponeimines in which each substituent (R in Formula I) on the nitrogen is alkyl, cycloalkyl, aryl, or monosubstituted aryl of up to 10 carbons. These compounds, which can be represented by the Formula I,

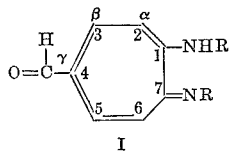

I readily form chelates with transition metals, including those of atomic number 22–30.

Derivatives of the formyl group, i.e., of compounds of Formula I are also included within the scope of this invention. These have the oxygen of the carbonyl replaced by nitrogen of primary amines as obtained by the Schiff base or anil condensation, i.e., compounds of Formula II,

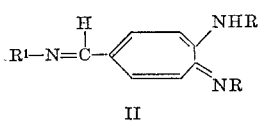

II wherein the R groups are as previously defined and $R^1$ is a monovalent radical of a primary amine ($R^1NH_2$) including $R^1$ being lower saturated aliphatic, especially 1–10 carbon alkyl, and cyclic of up to 10 carbons, e.g., aryl, cycloaliphatic and heterocyclic, especially heterocyclic radicals containing up to 3 nuclear nitrogens, and preferably 2 to 3 as the heteroatoms. Also included are the compounds formed where the $R^1$ has another $NH_2$ group as in hydrazine or a diamine.

A further class of compounds related to Formula I are those wherein the remaining valence of the carbonyl carbon is satisfied by hydrocarbyl or lower alkoxy, e.g. compounds of Formula III,

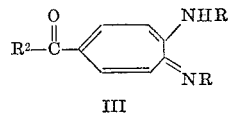

III wherein the R groups are as previously defined and $R^2$ is hydrocarbyl, including alkyl, aryl, and cycloalkyl of generally up to 8 carbons, or oxyhydrocarbyl, especially lower alkoxy.

Compounds represented by Formula IV

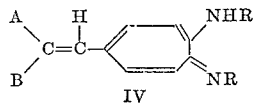

IV wherein R is as previously defined and no more than one of A and B is hydrogen, the remainder being aliphatic, alicyclic or aromatic, and preferably hydrocarbon of up to 8 carbons and wherein A and B together can be a divalent radical of generally 4 to 5 carbons, are also included. These are related to the other new compounds in that oxygen in Formula I is replaced by a double-bonded carbon.

The preferred process for the preparation of new compounds of this invention is the reaction of an N-γ-dilithio-N,N'-disubstituted aminotroponeimine (Formula V) with a carbonyl compound

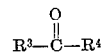

wherein $R^3$ is hydrogen, hydrocarbon of up to 8 carbons or alkoxy of preferably 1–4 carbons, and $R^4$ is lower alkoxy or halogen. In the above carbonyl compound $R^3$ is H as in Formula I or $R^2$ as in Formula III. The reaction can be represented as

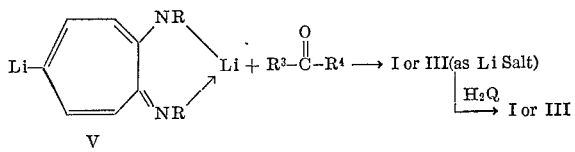

V

The lithium compound (V) is readily available by reaction of an alkyllithium with γ-bromo-N,N'-disubstituted-aminotroponeimine, obtainable as described in U.S. 3,052,-705, issued September 4, 1962, in inert diluent at temperatures of usually 0–50° C. The carbonyl compound (e.g., alkyl carboxylate, acyl halide or dialkyl carbonate) reacts with the lithium derivative at temperatures of the order of 0–50° C. Hydrolysis of the lithium compounds with water and separation provides carbonyl containing aminotroponeimines.

A further but less preferred method involves reaction of a γ - (α - hydroxylbenzyl) - N,N' - disubstitutedaminotroponeimine with bromine to give the γ-formyl derivative. This is further illustrated by Example I and is particularly useful where the N,N'-substituents are aryl, e.g., to give γ-formyl-N,N'-diphenylaminotroponeimine.

The following examples further illustrate the preparation and properties of the new compounds of this invention.

Example I.—γ-Formyl-N,N-diethylaminotroponeimine

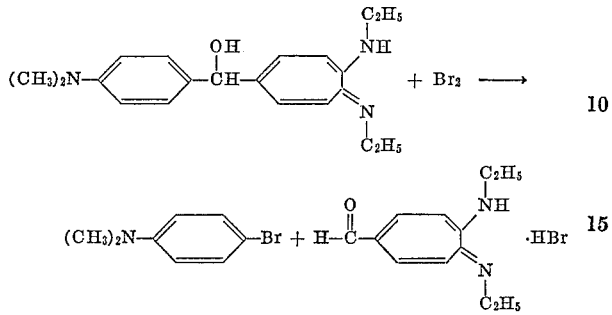

Three grams of γ - (α - hydroxy - p - dimethylaminobenzyl)-N,N'-diethylaminotroponeimine were dissolved in 30 ml. of chloroform and the clear yellow solution was cooled to 8–10° C. in an ice bath. A solution of 1.47 g. of bromine in 5 ml. of chloroform was added dropwise slowly. At first, the bromine color was instantaneously discharged, but then the solution gradually became darker. When the addition was complete, the mixture was allowed to warm gradually to 25° C., and a clear deep red solution resulted. The solvent was removed in a stream of nitrogen, and the dark residue was suspended in water and extracted with ether. The ether solution was dried and evaporated to give a yellow crystalline product contaminated with a small amount of oil. The infrared and proton NMR spectra of this product showed it to be p-bromo-N,N'-dimethylaniline together with a trace of carbonyl-containing impurity. The yield was 1.3 g. of material of 90–95% purity.

The water solution was made basic with ammonia and extracted with ether. After drying and removal of solvent, the yellow-orange residue slowly crystallized. The yield was 1.7 g. of material of 90% purity. The product was shown by infrared and NMR spectra to be γ-formyl-N,N'-diethylaminotroponeimine in conjunction with minor impurities.

Two crystallizations from pentane gave feathery yellow needles, M.P. 63–64° C.

Analysis.—Calcd. for $C_{12}H_{16}N_2O$: C, 70.6; H, 7.90; N, 13.7. Found: C, 70.4; H, 7.94; N, 13.7.

The γ - (α - hydroxy - p - dimethylaminobenzyl)-N,N'-diethylaminotroponeimine was obtained by reaction of p-dimethylaminobenzaldehyde with N - γ - dilithio - N,N'-diethylaminotroponeimine, which was obtained and reacted as follows: A solution of 5.10 g. of γ - bromo - N,N'-diethylaminotroponeimine in 100 ml. of anhydrous ether was cooled in a tap-water bath under a nitrogen atmosphere, and 24.2 ml. (2.56 g.) of a hexane solution of n-butyl lithium (0.107 g./ml.) was added dropwise. The addition caused gentle refluxing and a change in the color of the solution from yellow to red. When about one-half the butyl lithium was added, a yellow-brown solid began to separate. The mixture was stirred at room temperature for 1.5 hours. A solution of 3.0 g. of p-dimethylaminobenzaldehyde in 65 ml. of anhydrous ether was added dropwise at a moderate rate. After addition was complete, stirring was continued for ¾ hour and the yellow suspension was hydrolyzed with water. The deep red ether layer began to deposit yellow crystals, and after ½ hour these were isolated by filtration. The product weighed 2.65 g. when dry. The filtrate, consisting of two layers, was separated and the ether layer was washed several times with water and dried over magnesium sulfate. Evaporation of the solvent gave a dark red syrup which was taken up in ethanol and chilled to provide an additional 1.0 g. of product. The total yield of carbinol [γ - (α - hydroxy-p - dimethylaminobenzyl) - N,N' - diethylaminotroponeimine] was 3.65 g. (56.5%). Three crystallizations from ethanol gave bright lemon-yellow needles, M.P. 120–121° C.

Analysis.—Calcd. for $C_{20}H_{27}N_3O$: C, 73.8; H, 8.36; N, 12.9. Found: C, 73.8, 74.1; H, 8.40, 8.40; N, 12.9

Example II.—γ - Formyl-N,N'-diethylaminotroponeimine by reaction of N-γ-dilithio-N,N'-diethylaminotroponeimine with ethyl formate

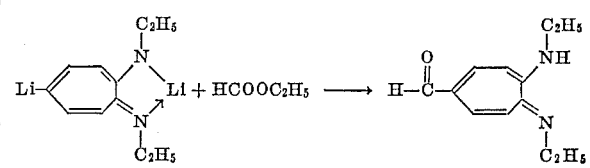

A solution of 5.10 g. of γ-bromo-N,N'-diethylaminotroponeimine in 100 ml. of anhydrous ether was cooled in a tap water bath, and 36 ml. of a hexane solution of n-butyl lithium (0.107 g./ml.) was added in a thin stream. When the addition was complete, the yellow suspension was refluxed for ½ hour and chilled in an ice bath. Ethyl formate (14.8 g.) was dissolved in 20 ml. of ether and added rapidly in one portion to the cold lithium derivative. An intense mint-green color developed quickly and persisted throughout the reaction period. After stirring for ¼ hour, the green suspension was refluxed for ¾ hour and hydrolyzed with water. The green color was discharged, and the ether layer became deep red. The aqueous layer was also deeply colored.

The ether solution, upon drying and evaporation, gave 4.0 g. of impure brown solid. The product was dissolved in hot pentane, treated with decolorizing charcoal, filtered, and chilled. Filtration gave 1.67 g. (41.7%) of yellow needles of γ-formyl-N,N'-diethylaminotroponeimine. The identity of the product was established by comparison of melting point and infrared and NMR spectra with those of the product of Example I.

Example III.—Reaction of γ-formyl-N,N'-diethylaminotroponeimine with hydrazine

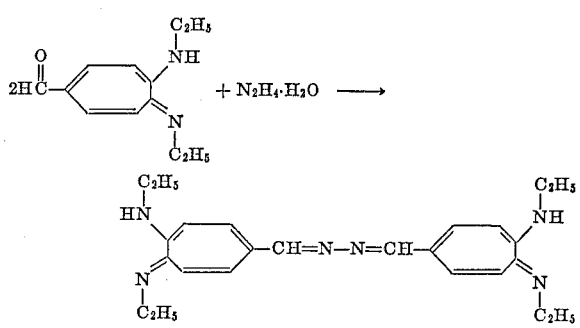

A solution of 1.57 g. of γ-formyl-N,N'-diethylaminotroponeimine in 15 ml. of ethanol containing a trace of p-toluenesulfonic acid was stirred and warmed while 0.20 ml. of hydrazine hydrate was added from a hypodermic syringe. After five minutes, a crystalline product began to separate from the red solution. Heating was discontinued and the mixture was allowed to stand at room temperature overnight, after which the entire reaction mass had solidified. Ethanol was added to facilitate stirring, and the mixture was stirred for one hour in a hot water bath. After cooling and filtering, there was obtained 1.13 g. (73.5%) of the azine of γ-formyl-N,N'-diethylaminotroponeimine. Recrystallization from benzene gave maroon needles, M.P. 231–234° C.

Analysis.—Calcd. for $C_{24}H_{32}N_6$: C, 71.3; H, 7.97; N, 20.8. Found: C, 71.3; H, 7.94; N, 20.7.

Example IV.—Reaction of γ-formyl-N,N'-diethylamino-troponeimine with p-phenylenediamine

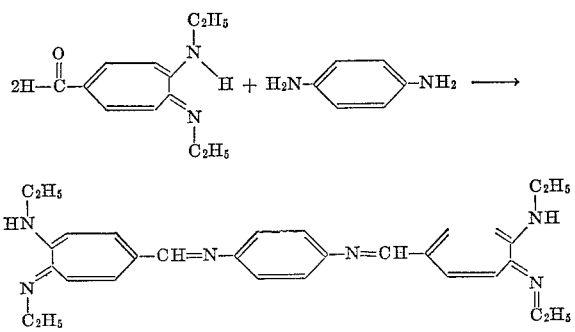

A solution of 1.0 g. of the formyl derivative and 0.27 g. of p-phenylenediamine in 15 ml. of ethanol containing a trace of p-toluenesulfonic acid was refluxed for two hours, then allowed to cool slowly. Filtration gave 0.6 g. (50%) of red crystals of the Schiff base. Recrystallization from benzene gave red plates, M.P. 235–237° C.

*Analysis.*—Calcd. for $C_{30}H_{36}N_6$: C, 75.0; H, 7.56; N, 17.5. Found: C, 75.3; H, 7.61; N, 17.5.

Chelates were prepared with various metals and the azine of γ-formyl-N,N'-diethylaminotroponeimine (see Example III) as detailed in Examples V–VIII as follows.

Example V

The azine of Example III (0.608 g.) was dissolved in 700 ml. of acetonitrile and 200 ml. of dimethylformamide. The deep red solution was heated to boiling and a solution of 0.38 g. of nickel (II) acetate tetrahydrate in 5 ml. of water was slowly added. The polymeric chelate separated immediately as a black, flocculent precipitate. The mixture was boiled for 18 hours and filtered while hot with care being taken to exclude dust and other atmospheric contaminants. The amorphous black solid was washed successively with several portions of aqueous ethanol (3:1), ethanol, and hot acetonitriledimethylformamide (3:1), it was dried at 120° C. under high vacuum for 24 hours.

*Analysis.*—Calcd. for $(C_{24}H_{30}N_6Ni)_n$: C, 62.5; H, 6.56; N, 18.2. Found: C, 62.3, 62.5; H, 6.84, 6.78; N, 18.1.

Example VI

In a manner like that described in the preceding example, the azine of Example III (0.61 g. was dissolved in 1 l. of acetonitrile and 250 ml. of dimethylformamide, and 0.3 g. of copper (II) acetate monohydrate in 5 ml. of water was added slowly. After 20 hours at reflux, the hot suspension was filtered, and the brownish-black powder was washed in succession several times with water, ethanol, hot benzene, hot dimethylformamide, and ethanol, and then it was dried in high vacuum at 120° C. for 24 hours.

*Analysis.*—Calcd. for $(C_{24}H_{30}N_6Cu)_n$: C, 61.85; H, 6.49; N, 18.0. Found: C, 61.3; H. 6.41; N, 18.4.

Example VII

As in the procedure described above, a solution of 0.329 g. zinc acetate dihydrate in 10 ml. of water was added slowly to a boiling solution of 0.61 g. of the azine of Example III in 750 ml. of acetonitrile and 250 ml. of dimethylformamide. The bright red polymeric chelate separated quickly and was stirred in the refluxing solvent for 24 hours. It was carefully filtered and washed with the array of solvents already noted in Examples V and VI. A final washing with ether was added. The amorphous solid was dried at 120–130° C. for 48 hours in high vaccuum.

*Analysis.*—Calcd. for $(C_{24}H_{30}N_6Zn)_n$: C, 61.6; H, 6.46; N, 18.0. Found: C, 62.2; H, 6.81; N, 17.7, 18.0

Example VIII

A solution of 0.405 g. of the azine Example III and 0.408 g. of nickel N,N'-diethylaminotroponeimineate (obtained according to the general procedure of U.S. 3,052,705) in 50 g. of biphenyl was transferred to an apparatus in which a solid mixture can be heated and any distillate collected on a cold finger above the reactant mixture. The solvent was removed by distillation at 120–140° C. (10–20 mm.). As biphenyl distilled, it was replaced in the pot with fresh material, and a total of about 200 ml. of yellow distillate was collected. The residue was then transferred to a Soxhlet apparatus and continuously extracted with chlorobenzene for several days. The insoluble black powder was dried in high vaccum.

*Analysis.*—Calcd. for $(C_{24}H_{30}N_6Ni)_n$: C, 62.5; H, 6.56; N, 18.2. Found: C, 59.2; H, 6.10; N, 16.4.

This sample was shown to contain ferromagnetic impurities on examination in a magnetic field of 5000 gauss. The polymer was ground to a powder, warmed to 50° C., and swept with carbon monoxide for 24 hours to remove any metallic nickel as the carbonyl. The sample was then allowed to fall freely through a glass tube suspended between the poles of a 5000 gauss magnet. When particles of magnetic impurities were no longer observed to be retained in the field, the sample was submitted for susceptibility measurements. On the basis of these studies, carried out between room temperature and 77° K., the polymer was shown to have a Weiss constant of about 22° K.±4°.

Example IX.—1,4-bis[β-(N,N'-diethylaminotroponeimin-γ-yl)-vinyl]benzene

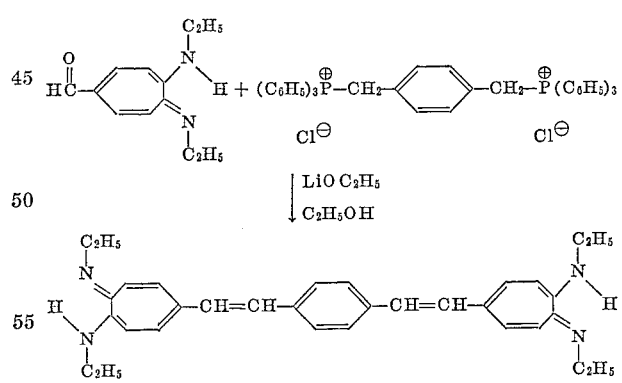

A solution of 1.02 g. of γ-formyl-N,N'-diethylaminotroponeimine and 1.75 g. of p-xylylenebis(triphenylphosphonium chloride) [McDonald et al., J. Org. Chem. 24, 1969 (1959)] in 25 ml. of absolute ethanol was treated at room temperature with 26 ml. of 0.2 M ethanolic lithium ethoxide. After one minute, during which the orange color deepened slightly, a crystalline solid separated. The mixture was stirred 24 hours, warmed 15 minutes, and an equal volume of water was added. After 15 minutes, the product was removed, washed with water and then with ethanol. The yield of orange plates was 0.69 g. (57.5%). After crystallization from benzene, the product melted over 300° C.

*Analysis.*—Calcd. for $C_{32}H_{38}N_4$: C, 80.3; H, 8.01; N, 11.7. Found: C, 80.3; H, 7.88; N, 11.8.

Example X.—γ-(β-styryl)-N,N'-diethylamino-troponeimine

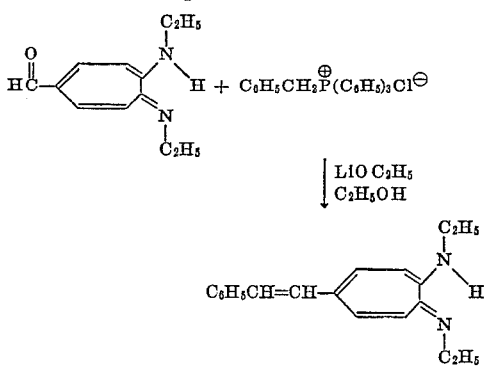

A solution of 2.04 g. of γ-formyl-N,N'-diethylamino-troponeimine and 3.89 g. of benzyltriphenylphosphonium chloride in 25 ml. of absolute ethanol was stirred in an open Erlenmeyer flask at room temperature while 52.5 ml. of 0.2 M ethanolic lithium ethoxide was added in one portion. The original orange color changed only slightly, and in 15 minutes the product began to separate from solution. After stirring overnight, the mixture was poured into an equal volume of water, stirred 30 minutes and filtered. The orange solid was washed with water and cold absolute ethanol and dried. There was obtained 1.77 g. (63.5%) of material, M.P. 135–137° C. Crystallization was carried out by dissolving the product in 20 ml. of benzene, filtering, and adding 20 ml. of ethanol, whereupon iridescent orange plates, M.P. 139–139.8° C., separated.

*Analysis.*—Calcd. for $C_{19}H_{22}N_2$: C, 82.0; H, 7.97; N, 10.06. Found: C, 82.0; H, 7.93; N, 10.01.

The nickel chelate crystallized from benzene as dark needles.

*Analysis.*—Calcd. for $C_{38}H_{42}N_4Ni$: C, 74.4; H, 6.91; N, 9.13. Found: C, 74.6; H, 6.88; N, 8.86.

Example XI.—γ-1-(4-phenyl-1,3-butadienyl)-N,N'-diethylaminotroponeimine

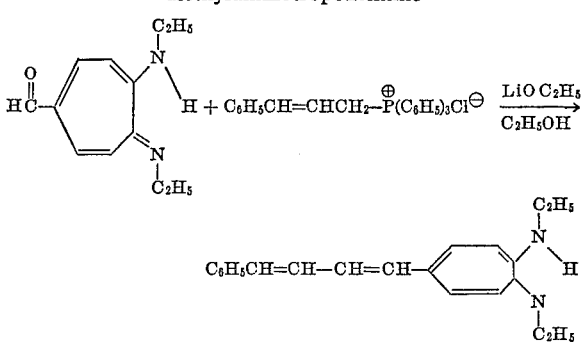

A solution of 2.04 g. of γ-formyl-N,N'-diethylamino-troponeimine and 4.15 g. of cinnamyltriphenylphosphonium chloride in 20 ml. of absolute ethanol was stirred at room temperature in an Erlenmeyer flask, and 52.5 ml. of 0.2 M ethanolic lithium ethoxide was added rapidly. Within ten seconds, following a fleeting red color, an orange crystalline precipitate began to form. The mixture was stirred at room temperature overnight, filtered, and washed successively with ethanol, water, and ethanol. The yield of dry product, M.P. 174.4–175° C., was 1.52 g. (50%). The aldehyde carbonyl band (5.98μ) was completely absent from the infrared spectrum of the product. A sample was crystallized from ethanol-benzene for analysis.

*Analysis.*—Calcd. for $C_{21}H_{24}N_2$: C, 82.9; H, 7.95; N, 9.21. Found: C, 82.9; H, 7.91; N, 9.16.

The nickel chelate, prepared in the usual way, crystallized from benzene as short, green-gold needles, M.P. >300° C.

*Analysis.*—Calcd. for $C_{42}H_{46}N_4Ni$: C, 75.8; H, 6.97; N, 8.43. Found: C, 75.6, 75.5; H, 6.97, 6.92; N, 8.49.

Example XII.—γ-carbethoxy-N,N'-diethylamino-troponeimine

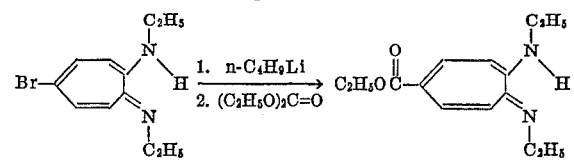

Thirty milliliters of a hexane solution of n-butyl-lithium (15 weight percent) was added to a solution of 5.10 g. of γ-bromo-N-N'-diethylaminotroponeimine in 100 ml. of anhydrous ether during 15 minutes. The mixture was refluxed for 30 minutes and cooled to −78° C. in a Dry Ice-acetone bath. Reagent grade diethyl carbonate (24 g.) was added in one portion. The cold suspension was stirred for 15 minutes, then the cooling bath was removed and the mixture allowed to warm slowly during four hours. After hydrolysis with water and removal of the ethereal layer, the aqueous portion was extracted once with ether, and the combined ether solutions were dried over magnesium sulfate. Filtration and evaporation of the solvent gave a yellow crystalline solid which was washed with cold pentane and dried in air. There was obtained 2.61 g. (52.5%) of yellow needles of γ-carbethoxy-N,N'-diethyl-aminotroponeimine. Concentration of the filtrate provided an additional 0.35 g. of needles for a total yield of 2.96 g. (59.5%). A sample crystallized twice from pentane and M.P. 72.4–72.7° C.

*Analysis.*—Calcd. for $C_{14}H_{20}N_2O_2$: C, 67.7; H, 8.12; N, 11.3. Found: C, 67.9; H, 8.12; N, 11.5.

Example XIII.—γ-Acetyl-N,N'-diethylaminotroponeimine

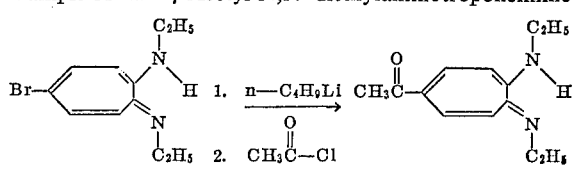

γ-Bromo-N,N'-diethylaminotroponeimine (5.10 g.) was treated with 30 ml. of a 15% n-butyl lithium solution in hexane as described in the preceding example, and the suspension of lithium reagent was cooled to −78° C. A fresh sample of acetyl chloride (14.2 ml., 15.7 g.) was added in one portion, and a dark chocolate-brown color resulted. The suspension was stirred at −78° C. for 45 minutes, then allowed to warm spontaneously for 15 minutes. Hydrolysis was effected with 35 ml. of water. The aqueous layer was adjusted to an alkaline pH with cold sodium hydroxide solution, and the ether layer and the organic extracts were dried over magnesium sulfate. Filtration and evaporation gave a low yield of yellow crystalline material. Two crystallizations from pentane provided yellow needles of γ-acetyl - N,N' - diethylaminotroponeimine, M.P. 65.9–66.7° C.

*Analysis.*—Calcd. for $C_{13}H_{18}N_2O$: C, 71.5; H, 8.31; N, 12.8. Found: C, 71.6; H, 8.24; N, 12.5.

Example XIV.—6-(N,N'-diethylaminotroponeimin-γ-yl) fulvene

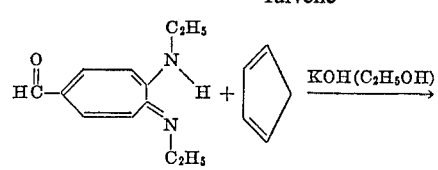

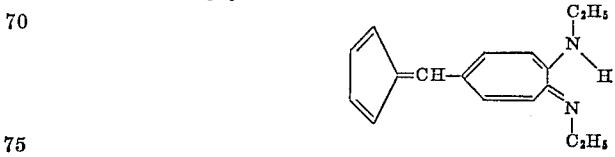

γ-Formyl - N,N' - diethylaminotroponeimine (4.08 g.) was suspended in 20 ml. of anhydrous ethanol under an atmosphere of nitrogen, and there was added successively 0.5 ml. of potassium hydroxide solution (20% in absolute ethanol) and 1.65 ml. of freshly distilled cyclopentadiene. The addition of the diene caused practically instantaneous dissolution of the suspended aldehyde, and the orange solution rapidly became deep red. The solution was stirred at room temperature overnight, warmed in a hot water bath for one hour, then chilled in ice for ½ hour. Filtration gave 4.1 g. (81%) of deep red needles of the crude fulvene. Crystallization from n-hexane using decolorizing charcoal gave 3.42 g. (67.5%) of material with melting point 99.2–100° C. Three further crystallizations from ethanol gave red needles, M.P. 101.5–102° C.

*Analysis.*—Calcd. for $C_{17}H_{20}N_2$: C, 80.9; H, 7.99; N, 11.1. Found: C, 81.3; H, 8.08; N, 11.0.

The nickel chelate, prepared in 90% yield by addition of aqueous nickel acetate to an ethanol solution of the fulvene, had a melting point >300° C. after two crystallizations from ethanol-benzene.

*Analysis.*—Calcd. for $C_{34}H_{38}N_4Ni$: C, 72.9; H, 6.83; N, 9.98. Found: C, 72.9; H, 6.73; N, 10.3.

Example XV.—Condensation of nickel γ-formyl-N,N'-diethylaminotroponeimineate with cyclohexylamine

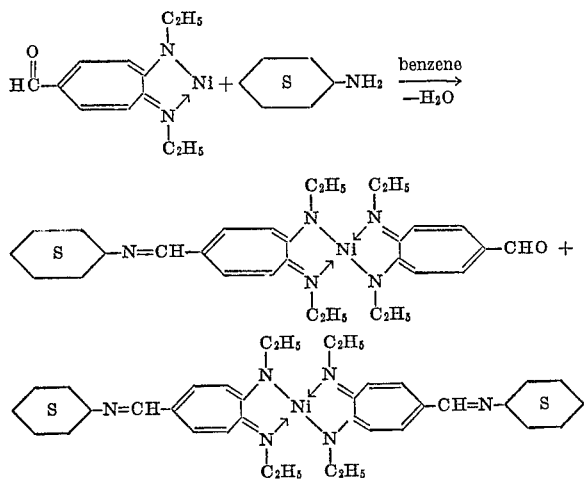

A solution of 0.47 g. of nickel γ-formyl-N,N'-diethylaminotroponeimineate and 0.20 g. of cyclohexylamine in 50 ml. of anhydrous benzene was refluxed under a Dean-Stark water separator for two hours. The solution was evaporated to dryness in a nitrogen stream, and the solid residue was shown by its infrared spectrum to be unchanged aldehyde chelate. This material was redissolved in 50 ml. of benzene and cyclohexylamine (0.20 g.) was again added along with a catalytic amount of p-toluenesulfonic acid. The solution was refluxed for three hours as above, and the solvent was removed in a rotary evaporator. The NMR spectrum (at 60 mc./s. with tetramethylsilane as internal reference) of the crystalline residue showed that there were three paramagnetic chelates present.

When the experiment was repeated with a large excess (10-fold) of cyclohexylamine and a trace of p-toluenesulfonic acid, the product was shown again to consist of the same three chelates described above. In this instance, the proportion of unchanged aldehyde chelate decreased sharply with corresponding increase in the other two components.

Examples XVI–XXI

The following general procedure was used to prepare further condensation products of γ-formyl-N,N'-diethylaminotroponeimine (see Example I) and various amines:

A solution of equimolar quantities (0.1 mmole) of an amine and γ-formyl-N,N'-diethylaminotroponeimine in 40 ml. of ethanol and 25 ml. of benzene containing two drops of acetic acid was slowly distilled, the pot volume being maintained by addition of ethanol. After 150 ml. of distillate was collected, the boiling point of the solution was that of pure ethanol. The solution was cooled and the solvent evaporated. The residue was recrystallized from an appropriate solvent. Pertinent data for the products obtained and the nickel (II) chelates obtained by reaction as shown in Example V are as follows:

Example XVI

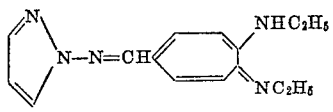

When the amine was 1-aminopyrazole, orange needles of the formyl condensation product corresponding to the above formula were obtained in 20% yield, M.P. 115.1–115.5° C. after crystallization from aqueous ethanol.

*Analysis.*—Calcd. for $C_{15}H_{19}N_5$: C, 66.88; H, 7.11; N, 26.01. Found: C, 66.90; H, 7.39; N, 26.23.

Reaction of the above compound with nickel acetate tetrahydrate in the manner of Example V gave a quantitative yield of the nickel chelate as green crystals, M.P. 193–194° C.

*Analysis.*—Calcd. for $C_{30}H_{36}N_{10}Ni$: C, 60.52; H, 6.10; N, 23.52. Found: C, 60.74; H, 6.43; N, 23.38.

The 1-aminopyrazole used was obtained by reacting pyrazole dissolved in aqueous sodium hydroxide with hydroxylamine-O-sulfonic acid. The solution was boiled for ten minutes and, after cooling, extracted with ether. Removal of the ether gave a mixture of oil and crystals of 1-aminopyrazole.

Example XVII

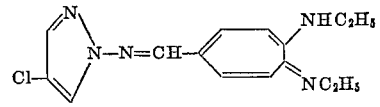

Using 1-amino-4-chloropyrazole, there was obtained in the form of red needles at a 35% yield the formyl derivative of the amine as illustrated above, M.P. 139° C. (crystallized from alcohol).

*Analysis.*—Calcd. for $C_{15}H_{18}N_5Cl$: C, 59.30; H, 5.97; N, 23.05; Cl, 11.69. Found: C, 59.21; H, 5.92; N, 22.70; Cl, 11.43.

The nickel chelate was obtained as emerald green crystals, M.P. 211–211.5° C.

*Analysis.*—Calcd. for $C_{30}H_{34}N_{10}Cl_2Ni$: C, 54.24; H, 5.16; N, 21.09; Cl, 10.67. Found: C, 54.54; H, 5.15; N, 21.22; Cl, 10.65.

The 1-amino-4-chloropyrazole was obtained in the manner described in the preceding example except that 4-chloropyrazole was used as the starting compound.

Example XVIII

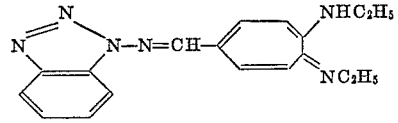

Using 1-aminobenzotriazole, there was obtained a 65% yield of the corresponding derivative of γ-formyl-N,N'-diethylaminotroponeimine as red needles, M.P. 149.0–149.5° C., after crystallization from aqueous ethanol.

*Analysis.*—Calcd. for $C_{18}H_{20}N_6$: C, 67.47; H, 6.29; N, 26.24. Found: C, 67.97; H, 6.54; N, 26.22.

The nickel chelate was obtained as purple crystals, M.P. 249.0–249.5° C., from methylene chloride/methanol.

*Analysis.*—Calcd. for $C_{36}H_{38}N_{12}Ni$: C, 61.99; H, 5.21; N, 24.10. Found: C, 62.08; H, 5.72; N, 24.17.

The 1-aminobenzotriazole, M.P. 84° C., was obtained by reaction of benzotriazole in aqueous sodium hydroxide with hydroxylamine-O-sulfonic acid. With longer heating cycles an increased proportion of the 1-amino product was obtained in the ether extract while shorter cycles gave a crystalline precipitate of the 2-aminobenzotriazole, M.P. 107–113° C., from the reaction mixture.

Example XIX

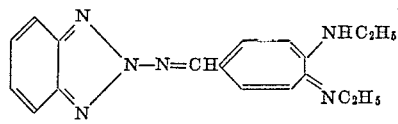

When 2-aminobenzotriazole was used in the general procedure as described in the preceding example, red needles of the corresponding isomeric condensation product, M.P. 154–155° C., were obtained by crystallization from ethanol.

*Analysis.*—Calcd. for $C_{18}H_{20}N_6$: C, 67.47; H, 6.29; N, 26.24. Found: C, 67.49; H, 6.45; N, 26.52.

The nickel chelate was obtained as green needles, M.P. 296° C., in quantitative yield.

*Analysis.*—Calcd. for $C_{36}H_{38}N_{12}Ni$: C, 61.99; H, 5.21; N, 24.10. Found: C, 61.51; H, 5.81; N, 24.13.

Example XX

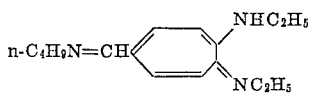

When the amine was n-butylamine, the condensation product was obtained as an oil, B.P. 165° C./0.3 mm.

*Analysis.*—Calcd. for $C_{16}H_{25}N_3$: C, 74.08; H, 9.72; N, 16.20. Found: C, 74.38; H, 10.02; N, 16.50.

Example XXI.—Anil of 1-aminoadamantane and γ-formyl-γ,N′-diethylaminotroponeimine

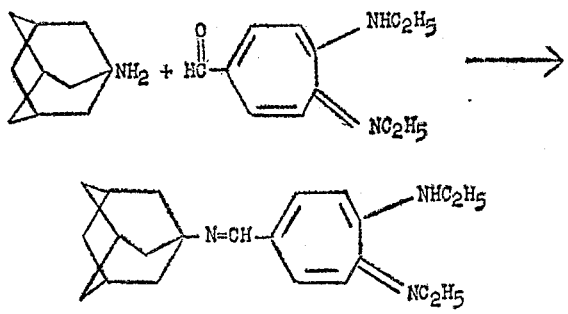

A solution of 1.16 g. of 1-aminoadamantane, 1.57 g. of γ-formyl-N,N′-diethylaminotroponeimine, and a few crystals of p-toluenesulfonic acid in 50 ml. of absolute ethanol was refluxed 18 hours. Evaporation of the solvent and recrystallization of the residue from methanol gave 1.77 g. (67%) of the anil, M.P. 126.5–127.0° C., as orange plates.

*Analysis.*—Calcd. for $C_{22}H_{31}N_3$: C, 78.29; H, 9.26; N, 12.45. Found: C, 77.80; H. 9.24; N, 12.74.

Repetition of the above except that 1-amino-3-hydroxyadamantane was used gave the corresponding hydroxy derivative, M.P. 100–107° C., after crystallization from cyclohexane. 3-hydroxyadamantane-1-carboxylic acid was subjected to the Curtius reaction to produce the starting 1-amino-3-hydroxyadamantane.

Although the preceding examples have used N,N′-diethylaminotroponeimine, other N,N′-disubstituted aminotroponeimines can be employed. Such others are readily available and have been described in U.S. 3,052,705. These include the lower alkyls, e.g., compounds represented by the formula

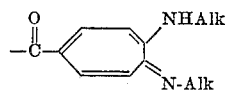

wherein Alk represents 1–18 carbon alkyl groups, e.g., N,N′-dimethylaminotroponeimine, N,N′-di-n-butylaminotroponeimine, and N,N′-di-n-octadecylaminotroponeimine.

Likewise, cyclic groups can be present on each nitrogen of the 1-amino-7-imino-1,3,5-cycloheptatrienyl compound including those having up to 18 carbons such as N,N′-diphenylaminotroponeimine, N,N′ - di - α-naphthylaminotroponeimine, N,N′ - di(phenanthryl)aminotroponeimine, and N,N′-di[4-(β-phenylethylene)phenyl]aminotroponeimine. Also useful are N,N′-dicyclohexylaminotroponeimines. The immediately preceding can be represented by the formula

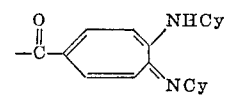

where Cy represents a cyclic group of up to 10 carbons (generally 6–10) free of open chain unsaturation and preferably aromatic, e.g., phenyl or lower alkylphenyl.

The new compounds of this invention form chelates with the transition metals including titanium, vanadium, chromium, manganese, iron, cobalt, nickel, copper and zinc, i.e., divalent metals of atomic number 22–30, although those of 26–30 are preferred.

The new compounds of this invention are colored and are generically useful as dyes for textiles. For example, when the γ-acyl-N,N′-disubstituted aminotroponeimines are dissolved in dimethylformamide and added to boiling water, acetate, nylon, silk and wool fabrics were dyed yellow to yellowish brown while the chelates formed darker shades.

The metal chelates are a particularly interesting class of compounds. Polymeric chelates are obtained from products having an azine group in the γ-position as shown by Examples V–VIII. The latter can be formed in situ in fabric by immersion of fabric dyed with a γ-azine-bis-N,N′-disubstituted aminotroponeimine in an aqueous solution of a transition metal salt; for example, nickelous acetate produces a polymeric chelate which is insoluble and gives a blue-to-purple color in the fabric.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

I claim:
1. A compound of the formula

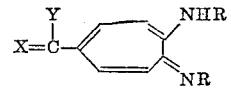

wherein the two R substituents are each hydrocarbyl radicals of up to 18 carbons free from aliphatic unsaturation; X is a member selected from the group consisting of O, R′—N, N—N, N—R′—N,

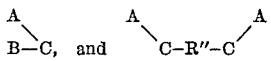

with the proviso that each nitrogen and each carbon shown in the above group for X is doubly bonded to a divalent radical as shown in the above formula; R′ is a radical of up to 10 carbons which, when joined to one nitrogen, is a monovalent radical selected from the group consisting of alkyl, aryl, cycloalkyl, and heterocyclic radicals of up to 3 nitrogen heteroatoms, and, when joined to two nitrogens, is a divalent arylene radical; R″ is a divalent arylene radical; A and B taken singly are members selected from the group consisting of hydrogen and hydrocarbyl radicals of up to 8 carbons, with the proviso that not more than one of A and B is hydrogen, and A and B taken together is a divalent hydrocarbyl radical of up to 5 carbons; and Y is a member selected from the group consisting of hydrogen, lower alkoxy, and hydrocarbyl radicals of up to 8 carbons and free from aliphatic unsaturation.

2. Chelates with transition metals of the compounds of claim 1.

3. A compound of claim 1 wherein X is oxygen and Y is hydrogen.

4. Chelates with transition metals of the compounds of claim 3.

5. A compound of claim 1 wherein X is N—N, with the proviso that each of the two nitrogen atoms is doubly bonded to a divalent radical as shown in the formula in claim 1; and Y is hydrogen.

6. Polymeric chelates with transition metals of the compounds of claim 5.

7. A compound of claim 1 wherein X is N—R'—N, with the proviso that each of the two nitrogen atoms is doubly bonded to a divalent radical as shown in the formula in claim 1; R' is a divalent arylene radical of up to 10 carbons; and Y is hydrogen.

8. A compound of claim 1 wherein X is

wherein A is hydrogen and B is a hydrocarbyl radical of up to 8 carbons; and Y is hydrogen.

9. A compound of claim 1 where X is

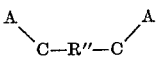

with the proviso that each of the two carbon atoms shown above is doubly bonded to a divalent radical as shown in the formula in claim 1; R" is a divalent arylene radical; the two A substituents are each hydrogen; and Y is hydrogen.

10. A compound of claim 1 wherein X is oxygen and Y is a lower alkoxy radical.

11. A compound of claim 1 wherein X is oxygen and Y is a hydrocarbyl radical of up to 8 carbons free from aliphatic unsaturation.

12. γ-Formyl-N,N'-diethylaminotroponeimine.
13. γ-Acetyl-N,N'-diethylaminotroponeimine.
14. γ-Carbethoxy-N,N'-diethylaminotroponeimine.

No references cited.

TOBIAS E. LEVOW, *Primary Examiner.*

A. P. DEMERS, *Assistant Examiner.*